US009530221B2

(12) United States Patent
Zhu et al.

(10) Patent No.: US 9,530,221 B2
(45) Date of Patent: Dec. 27, 2016

(54) CONTEXT AWARE MOVING OBJECT DETECTION

(75) Inventors: Hongwei Zhu, Fresno, CA (US); Farzin Aghdasi, Clovis, CA (US); Greg Millar, Coarsegold, CA (US); Lei Wang, Clovis, CA (US)

(73) Assignee: PELCO, INC., Clovis, CA (US)

(*) Notice: Subject to any disclaimer, the term of this patent is extended or adjusted under 35 U.S.C. 154(b) by 1203 days.

(21) Appl. No.: 13/345,228

(22) Filed: Jan. 6, 2012

(65) Prior Publication Data

US 2013/0176430 A1    Jul. 11, 2013

(51) Int. Cl.
*H04N 7/00*    (2011.01)
*G06T 7/20*    (2006.01)

(52) U.S. Cl.
CPC ... *G06T 7/2053* (2013.01); *G06T 2207/10016* (2013.01); *G06T 2207/30196* (2013.01); *G06T 2207/30232* (2013.01)

(58) Field of Classification Search
CPC .......... H04N 7/181; H04N 7/183; H04N 7/18; H04N 7/188; G08B 13/19656
USPC .......................................................... 386/143
See application file for complete search history.

(56) References Cited

U.S. PATENT DOCUMENTS

| 6,507,417 B1* | 1/2003 | Makihira et al. | 358/486 |
| 2009/0324026 A1* | 12/2009 | Kletter | 382/124 |

FOREIGN PATENT DOCUMENTS

EP    0671706 A2    9/1995

OTHER PUBLICATIONS

International Preliminary Report on Patentability for International Application No. PCT/US2012/071967, mailed Jul. 17, 2014, 11 pages.
Garcia, Alvaro, et al., "Real time video foreground extraction based on context-aware background subtraction", Technical report TR-GTI-UAM-2007, Feb. 1, 2007, pp. 1-4.
Piccardi, Massimo, "Background subtraction techniques: a review", 2004 IEEE International Conference on Systems, Man and Cybernetics, Oct. 10, 2004, vol. 4, pp. 3099-3104.
Su, Shu-Te, et al., "Moving Object Segmentation Using Improved Running Gaussian Average Background Model", Digital Image Computing: Techniques and Applications, 2008. Dicta '08, IEEE, Dec. 1, 2008, pp. 24-31.
International Search Report and Written Opinion for PCT/US2012/071967, mailed Mar. 25, 2013.
Communication pursuant to Article 94(3) EPC for European Application No. EP12813730.4, dated Apr. 26, 2016, 5 pgs.

* cited by examiner

*Primary Examiner* — William C Vaughn, Jr.
*Assistant Examiner* — Daniel Tekle
(74) *Attorney, Agent, or Firm* — Hunter Clark PLLC

(57) ABSTRACT

An image capture system includes: an image capture unit configured to capture a first image frame comprising a set of pixels; and a processor coupled to the image capture unit and configured to: determine a normalized distance of a pixel characteristic between the first image frame and a second image frame for each pixel in the first image frame; compare the normalized distance for each pixel in the first image frame against a pixel sensitivity value for that pixel; determine that a particular pixel of the first image frame is a foreground or background pixel based on the normalized distance of the particular pixel relative to the pixel sensitivity value for the particular pixel; and adapt the pixel sensitivity value for each pixel over a range of allowable pixel sensitivity values.

33 Claims, 9 Drawing Sheets

CONTEXT AWARE MOVING OBJECT DETECTION

BACKGROUND

Visual object detection and tracking for fixed surveillance cameras is a fundamental function of video analytics and plays a critical role in many intelligent video applications including visual event/behavior detection, video content extraction, video content guided video compression, video content based forensic search, etc. As cameras become less expensive and are installed more widely, this function becomes more important than ever and is expected to offer higher performance.

A challenge for object detection is to accurately detect objects under various scenarios and conditions, such as normal lighting, low lighting, day-time, night-time, in the presence of reflection and/or shadows, etc. Typically, manual manipulation and delicate tuning of parameters, including detection sensitivity, are used in order to fit the scene environment and lighting conditions. If conditions change, preset parameters may become invalid and poor performance could be produced. For example, parameters set for normal lighting conditions may not apply to low lighting cases and thus objects may not be detected.

Another challenge in object detection and tracking is over-segmentation of an object, i.e., a single physical subject is split into multiple visual parts. As a result, multiple tracks (trajectories) are produced for the single physical subject, and the tracks appear fragile and/or may fluctuate over time, thus providing erroneous information when these tracks are used in raising alarms or for forensic search. For instance, when a person walks in a scene, the person's body parts (e.g., head, torso, hands, and legs) should be detected as a single image blob and then tracked as a whole entity over time. Body parts, however, are sometimes segmented separately and each segment may be tracked some of the time, merged and split at other times, an/or appear and disappear frequently. This can be confusing and annoying when the tracks are visualized on a display and further processing on them may lead to incorrect outcomes (e.g., wrong object type classification, event/behavior detection, etc.).

SUMMARY

An example of an image capture system includes: an image capture unit configured to capture a first image frame comprising a set of pixels; and a processor coupled to the image capture unit and configured to: determine a normalized distance of a pixel characteristic between the first image frame and a second image frame for each pixel in the first image frame; compare the normalized distance for each pixel in the first image frame against a pixel sensitivity value for that pixel; determine that a particular pixel of the first image frame is a foreground or background pixel based on the normalized distance of the particular pixel relative to the pixel sensitivity value for the particular pixel; and adapt the pixel sensitivity value for each pixel over a range of allowable pixel sensitivity values.

Implementations of such a system may include one or more of the following features. The processor is configured to compute the pixel sensitivity value for each pixel based on a base sensitivity value. The processor is configured to adjust the base sensitivity value based on ratios of strong motion pixels to total motion pixels in identified blobs in the frames. The processor is configured to: determine a histogram of percentage of strong motion pixels to total motion pixels in the identified blobs; determine a peak index value of the histogram with a highest count among all index values of the histogram; decrease the base sensitivity value if the peak index value is undesirably low; and increase the base sensitivity value if the peak index value is undesirably high.

Also or alternatively, implementations of such a system may include one or more of the following features. The processor is configured to determine the normalized distance as one of a finite plurality of normalized distance values, and wherein the second frame is a background frame. The processor is further configured to identify motion blobs by: grouping neighboring pixels from a start level to an end level of the normalized distance; and monitoring changes over different levels in terms of number of pixels determined to be foreground pixels and a size of a bounding box of a region enclosing these foreground pixels. The processor is further configured to generate objects by merging neighboring blobs together based on perspective information and previously tracked objects. The processor is further configured to: determine whether each location of the second frame is noisy and, if so, how noisy; determine whether each location in the second frame is part of a salient track; and learn perspective information of a monitored scene.

Also or alternatively, implementations of such a system may include one or more of the following features. The processor is further configured to: track objects over multiple frames; compute a confidence value for each tracked object by calculating statistics of features of the objects over the multiple image frames; and account for variant object features. The processor is further configured to: update a scene noise map based on the confidence value of each of the tracked objects; update a sensitivity map based on the confidence value of each of the tracked objects; update a track salience map based on the confidence value of each of the tracked objects; and update an object fitness index histogram based on the confidence value of each of the tracked objects. The processor is further configured to compute the sensitivity value for each pixel based on the scene noise map and the track salience map. The processor is further configured to automatically determine a perspective map by identifying size-persistent tracked objects and by comparing sizes of the size-persistent tracked objects at different scene locations relative to one or more reference object sizes.

An example of an imaging method includes: capturing a first image frame comprising a set of pixels; determining a normalized distance of a pixel characteristic between the first image frame and a second image frame for each pixel in the first image frame; varying a value of a reference from a start value to an end value within a range of possible normalized distance values; comparing the normalized distance for each unlabeled pixel in the first image frame against a present value of the reference; and labeling pixels whose normalized distance is greater than the present value of the reference.

Implementations of such a method may include one or more of the following features. The method further includes: grouping labeled neighboring pixels of the first image frame into a blob; and monitoring changes over different values of the reference in terms of number of pixels in the blob and a size of a bounding box of the blob. The method further includes generating objects by merging neighboring blobs together based on perspective information and previously tracked objects.

Also or alternatively, implementations of such a method may include one or more of the following features. The method further includes: computing a pixel sensitivity value for each pixel based on a base sensitivity value; using the pixel sensitivity value to determine the normalized distances and to group pixels into a blob; and altering the base sensitivity value. Altering the base sensitivity value is based on ratios of strong motion pixels to total motion pixels in identified blobs in the image frames. Altering the base sensitivity value includes: determining a histogram of percentage of strong motion pixels to total motion pixels in the identified blobs; determining a peak index value of the histogram with a highest count among all index values of the histogram; decreasing the base sensitivity value if the peak index value is undesirably low; and increasing the base sensitivity value if the peak index value is undesirably high.

Also or alternatively, implementations of such a method may include one or more of the following features. The method further includes: determining whether each location of the second frame is noisy and, if so, how noisy; determining whether each location in the second frame is part of a salient track; and learning perspective information of a monitored scene. The method further includes: tracking objects over multiple frames; computing a confidence value for each tracked object by calculating statistics of features of the objects over the multiple image frames; and accounting for variant object features. The method further includes: updating a scene noise map based on the confidence value of each of the tracked objects; updating a sensitivity map based on the confidence value of each of the tracked objects; updating a track salience map based on the confidence value of each of the tracked objects; and updating an object fitness index histogram based on the confidence value of each of the tracked objects. The method further includes computing a pixel sensitivity value for each pixel based on the scene noise map and the track salience map. The method further includes automatically determining a perspective map by identifying size-persistent tracked objects and by comparing sizes of the size-persistent tracked objects at different scene locations relative to one or more reference object sizes.

An example of a moving object detection system includes: an image capture unit configured to capture image frames each comprising a set of pixels; means for determining a normalized distance of a pixel characteristic between a plurality of the image frames for each pixel in the image frames; means for identifying motion blobs comprising neighboring pixels of similar normalized distance values; and means for forming objects by combining neighboring motion blobs based on perspective information associated with the blobs.

Implementations of such a system may include one or more of the following features. The system further includes means for determining the perspective information by tracking an object over multiple ones of the image frames and using one or more reference object sizes in the multiple ones of the image frames. The system further includes means for altering pixel sensitivity information based on a base sensitivity value, a scene noise map, and a track salience map, wherein the means for determining the normalized distance uses the sensitivity information to determine the normalized distance. The means for altering the pixel sensitivity information are configured to adjust a base sensitivity value based on ratios of strong motion pixels to total motion pixels in identified blobs in the frames. The system further includes: means for determining a histogram of percentage of strong motion pixels to total motion pixels in the identified blobs; means for determining a peak index value of the histogram with a highest count among all index values of the histogram; means for decreasing the base sensitivity value if the peak index value is undesirably low; and means for increasing the base sensitivity value if the peak index value is undesirably high.

Also or alternatively, implementations of such a system may include one or more of the following features. The means for identifying motion blobs comprises: means for grouping neighboring pixels from a start level to an end level of the normalized distance; and means for monitoring changes over different levels in terms of number of pixels determined to be foreground pixels and a size of a bounding box of a region enclosing these foreground pixels. The system further includes means for generating objects by merging neighboring blobs together based on perspective information and previously tracked objects. The system further includes: means for tracking objects across multiple image frames; means for computing a confidence value for each tracked object by calculating statistics of features of the objects over multiple image frames; and means for accounting for variant object features. The system further includes: means for updating a scene noise map based on the confidence value of each of the tracked objects; means for updating a sensitivity map based on the confidence value of each of the tracked objects; means for updating a track salience map based on the confidence value of each of the tracked objects; means for updating the object fitness index histogram based on the confidence value of each of the tracked objects. The system further includes: means for determining whether each location of the second frame is noisy and, if so, how noisy; means for determining whether each location in the second frame is part of a salient track; and means for learning perspective information of a monitored scene.

Items and/or techniques described herein may provide one or more of the following capabilities, as well as other capabilities not mentioned. For example, implementations take into account available information, the sensitivity of motion pixel detection is automatically determined and noise levels in a scene are learned. Object detection and tracking can be performed robustly, e.g., under a wide range of lighting conditions and/or with good compactness (eliminating fragile tracks), and thus benefiting those video applications relying on quality of tracked objects. Manual configuration of an object detection system may be reduced or eliminated. Further, it may be possible for an effect noted above to be achieved by means other than that noted, and a noted item/technique may not necessarily yield the noted effect.

DETAILED DESCRIPTION

Techniques are provided for a context aware approach to object detection. For example, object detection is performed using adaptive motion pixel detection, automated detection of noisy regions, motion blob segmentation, and tracking of objects, and perspective guided object detection. Object detection is treated as a comprehensive process affected by motion pixel extraction, tracked objects, and camera perspective projection. Sensitivity adjustments for object detection are performed automatically, with adjustments performed over time from learned information regarding background and foreground objects.

Figure 1:
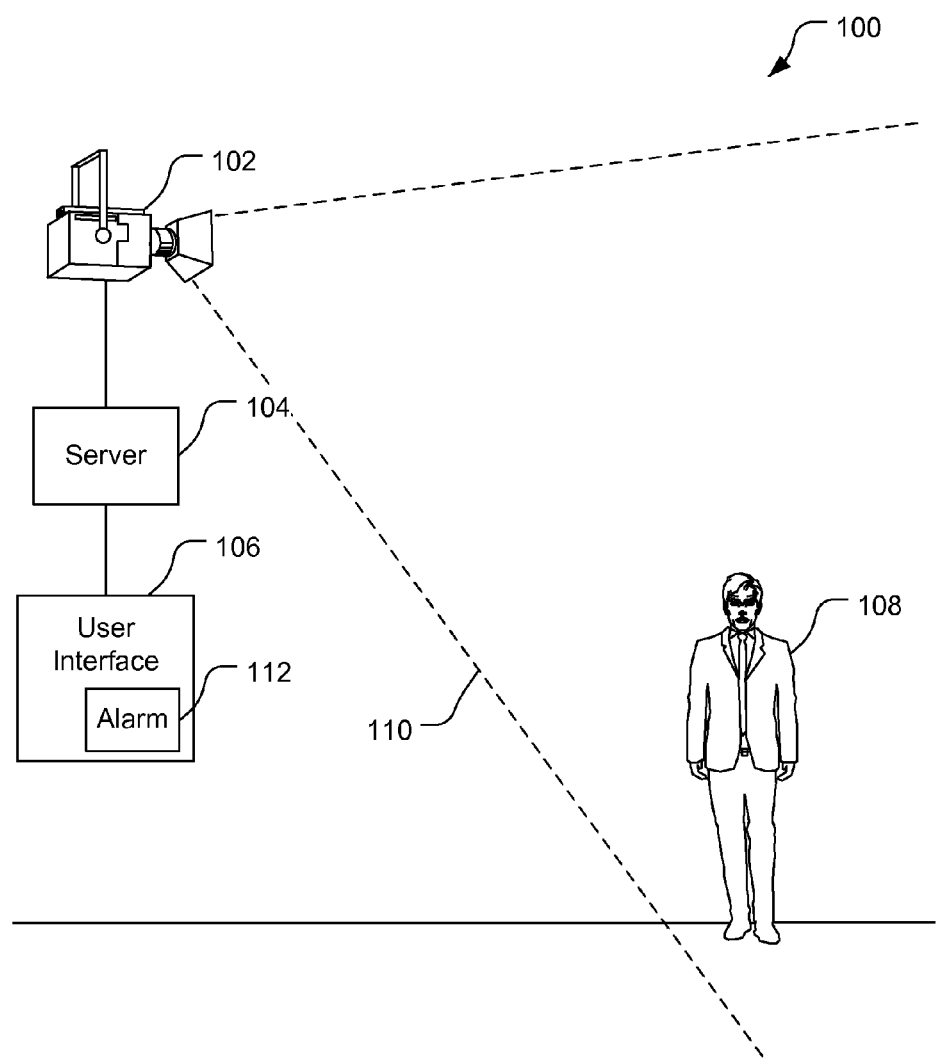
FIG. 1 is a schematic diagram of a security camera network.

Referring to FIG. 1, a security camera network 100 includes a digital camera 102, a server 104, and a user interface 106. The camera 102 is configured to capture images of objects, such as a person 108, disposed within a field of view 110 of the camera 102. The camera 102 may be a fixed-position camera, PTZ (Pan-Tilt-Zoom) camera, or other type of camera. Further, while only one camera 102 is shown, the system 100 may include more than one camera. The camera is communicatively connected (e.g., with a wired and/or wireless connection) to the server 104 that is communicatively connected to the user interface 106. The interface 106 includes a display and speakers to provide visual and audio information to a user. The interface 106 includes an alarm module 112 that is configured to provide alerts to the user via the speakers and display, e.g., to indicate the presence of a moving, non-background object within the field of view of the camera 102.

The camera 102 has an associated point of view and the field of view 110. The point of view is the position and perspective from which a physical region is being viewed by the camera 102. The field of view 110 is the physical region captured in frames by the camera 102.

Figure 2:
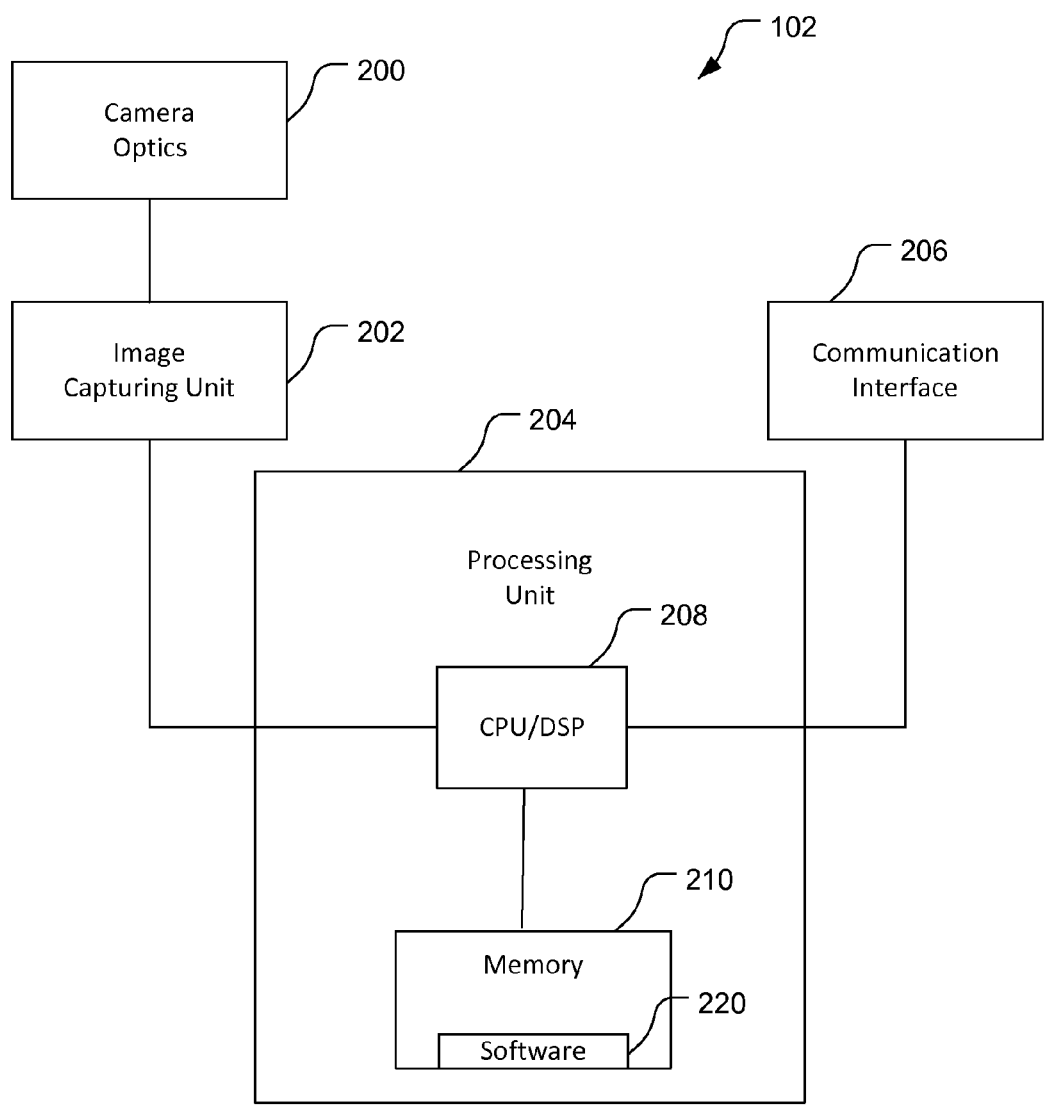
FIG. 2 is a block diagram of a camera shown in FIG. 1.

Referring also to FIG. 2, the camera 102 includes camera optics 200, an image capturing unit 202, a processing unit 204, and a communication interface 206. The camera optics 200 comprises lenses and other optical components, and is communicatively coupled with the image capturing unit 202. The image capturing unit 202 includes a complementary metal oxide semiconductor (CMOS) charge-coupled device (CCD) and/or other technology to convert optical images into electrical information that is transferred to the processing unit 204. The unit 202 is sensitive to the intensity of light incident upon the unit 202 that can be used to produce a VGA color image periodically, e.g., 30 frames per second. Also coupled with the processing unit 204 is the communication interface 206 through which information is sent to and received from the server 104, e.g., through a communication network such as a local area network, a wide area network, a wireless network, etc.

The processing unit 204, also referred to as the processor 204, processes image information and includes a central processing unit (CPU) or digital-signal processor (DSP) 208 and memory 210. The CPU/DSP 208 is preferably an intelligent device, e.g., a personal computer central processing unit (CPU) such as those made by Intel® Corporation or AMD®, a microcontroller, an application specific integrated circuit (ASIC), etc. DSPs, such as the DM6446 made by Texas Instruments®, can also be used. The CPU/DSP 208 is coupled to the memory 210 that includes random access memory (RAM) and read-only memory (ROM). The memory 210 is non-transitory and preferably stores machine-readable, machine-executable software code 220 containing instructions that are configured to, when executed, cause the CPU/DSP 208 to perform various functions described herein. Alternatively, the software 220 may not be directly executable by the processor CPU/DSP 208 but is configured to cause the processor CPU/DSP 208, e.g., when compiled and executed, to perform functions described herein.

The processing unit 204 can analyze the information from the image capturing unit 202 to produce image frames and to generate a background image. The processing unit 204 can collect statistics for each pixel of the captured images over time. Due to noise and changing conditions in the images, the value of a pixel's intensity will vary over time, typically roughly according to a Gaussian curve of pixel intensity given a constant color of the subject in the corresponding location. A mathematical model of the value of the pixel intensity over time is generated by the processing unit 204, e.g., with a mean and standard deviation of a Gaussian curve. The processing unit 204 can compile the mathematical images of all the pixels to serve as a background image. The processing unit 204 preferably will update the background image, e.g., after every new frame captured by the image capturing unit 202.

The processing unit 204 can compare the present image with the background image to determine whether a moving object is present in the field of view 110 of the camera 102. The processing unit 204 can subtract the background image from the present image (or vice versa), to yield differential pixel values and determine whether any differential pixel value has a significant magnitude, e.g., exceeds a threshold. A new or moving object in the image will yield a number of neighboring differential pixel values with significant magnitude. The pixels with significant differential values constitute the foreground of the image.

The processing unit 204 can determine whether foreground pixels or neighbor groups, blobs, of foreground pixels can be excluded from consideration as an object or should be considered for further analysis. For example, the processing unit 204 can ignore blobs of insignificant size (e.g., below a threshold number of pixels), pixel color, and/or repetitive motion (e.g., over time, the same pixels yield a repeating differential value, e.g., due to a non-relevant object repetitively moving, such as a tree swaying in the wind). Otherwise, a blob is labeled and designated for further analysis.

The processor 204 can prepare and maintain a histogram, called an object fitness index histogram, to measure the quality of moving objects in the camera's field of view 110 in terms of percentage of the number of strong motion pixels of an object versus the total number of motion pixels of the object. The processor 204 can use this histogram to adjust a base sensitivity factor used for automated sensitivity control.

The processor 204 can define a scene noise map to indicate whether each scene location is noisy or not. For example, regions with a waving tree or leafs should be considered as noisy while an open traffic road is not.

The processor 204 is configured to develop a track salience map to specify when and how each location in the scene has been visited by a salient track (a highly trusted track corresponding to a true subject in the scene), in terms of motion history image. A track is a trajectory of locations (together with bounding boxes, rectangles, that surround respective objects) when an object travels in a scene from its first appearance to its disappearance. Due to noise in the scene, a tracked object may correspond to non-relevant items such as a tree, a bush, or light reflection. Thus, the track may be detected as a noise track by analyzing the tracks features, e.g., object size, persistence, travel length, change of speed and/or direction, etc. Conversely, a track may be a salient track if its corresponding object movies in the scene persistently in terms of features examined. The track salience map collaborates with the noise map such that a pixel visited by any salient track in near past is not considered for a noisy pixel test. That is, noisy pixels specified by the scene noise map can only occur for those which have not been visited for a long time by any salient track. The salience map is a frame of values for pixels that each indicates the time (e.g., represented by a number from 0 to 255) since a salient track last visited each pixel (i.e., the time since each pixel was part of a tracked object).

The processor 204 is further configured to produce a sensitivity map to determine how motion pixels are generated over the scene. Each pixel value, $k_i$, in the map is a control factor for scene location i that is used to determine whether the pixel at location i is a motion pixel or a background pixel by distance comparison between input pixel values and learned background values. Here, the "distance" is a measure of a feature, e.g., pixel intensity difference, not a physical distance. The sensitivity map is established automatically, and its pixel values range from a base sensitivity factor $k_{base}$ to a preset maximum sensitivity factor $k_{max}$ (e.g., $k_{max}=10$). The base sensitivity factor is a global (i.e., applicable to all pixels in a frame) parameter and it is determined based on object activities occurring in the scene and ranges from 2 to $k_{max}$. The determination of the base sensitivity is discussed more fully below with respect to FIG. 6.

The sensitivity map helps differentiate background pixels from motion pixels by evaluating the distances to background pixels in a relative sense to learned standard deviations of the pixels. Given a pixel location, a background model is learned on the fly in terms of a mean and a standard deviation value of a selected feature, here pixel intensity. For a new frame, the pixel's intensity is compared with the mean, and the distance is calculated. This distance is then normalized by the standard deviation (i.e., divided by the standard deviation) at the same pixel location. The processor 204 can compare this normalized distance with a sensitivity value ($k_i$) for this pixel (i.e., a pixel sensitivity value). If the normalized distance is greater than the sensitivity value, the processor 204 classifies this pixel as a motion pixel, and otherwise classifies the pixel as a background pixel.

The processor 204 is further configured to produce a normalized distance level map. In this map, each value represents a relative distance between its feature (e.g., pixel intensity) and a single model if the running average method is used or a closest matched background model for the corresponding pixel if mixture Gaussian modeling is used.

Given input video frames from the camera 102 watching a scene of interest, one or multiple background models can be learned for each pixel using any of a variety of background modeling methods, e.g., running average and Gaussian mixture modeling (GMM), and an input pixel can be detected as a foreground pixel (motion pixel) or a background pixel by comparing with background models. The processor 204 can compute a normalized distance according to $$d(f_i, m_{ij}) = \left| \frac{f_i - \mu_{ij}}{\delta_{ij}} \right|$$

to measure the relative distance between feature value $f_{ij}$ at pixel i and $j^{th}$ background model $m_{ij}$ at the same pixel with mean $\mu_{ij}$ and standard deviation $\delta_{ij}$. If the running average approaches are applied, $\mu_{ij}$ and $\delta_{ij}$ are respectively the mean and the standard deviation obtained, which can be considered as the only model.

Given pixel i with feature value $f_i$, its closest background model, $m_{ic}$, is found by $$m_{ic} = \underset{m_{ij}}{\mathrm{argmin}}(f_i, m_{ij}).$$

The matched background model $m_{ic}$ may be ascertained by also considering the probability of the matched background model representing the background (e.g., the relative number of pixels used to update or belong to the model during background modeling) if Gaussian mixture modeling is utilized.

Pixel i may be classified as a foreground pixel (motion pixel) if $d(f_i, m_{ij}) > k_i$, or background pixel if $d(f_i, m_{ij}) \le k_i$, where $k_i$ serves as a control factor of sensitivity for pixel i, and it is stored in the sensitivity map. The processor 204 can calculate the value of the normalized distance level map at pixel i according to:

$$\text{lev}_i = \min(d(f_i, m_{ic}) \times \text{MaxLev}/k_i, \text{MaxLev}),$$

where MaxLev is a preset maximum level, e.g. 10. Therefore, pixel values of the level map range from 0 to MaxLev, and are controlled by the sensitivity map.

The processor 204 is further configured to produce a perspective map to model the projection property of the camera 102 capturing video of a scene. In this map, each pixel is represented by a scaling factor for a corresponding location relative to a reference location.

The processing unit 204 is also configured to send the captured video data and metadata through the communication interface 206 to the server 104. The processing unit 204 sends compressed video data that includes the video frames, and metadata with a description indicating characteristics of semantically significant portions of the video data, to the server 104. For example, the metadata may indicate the height and width, color, and velocity (speed and direction) of an object.

Figure 3:
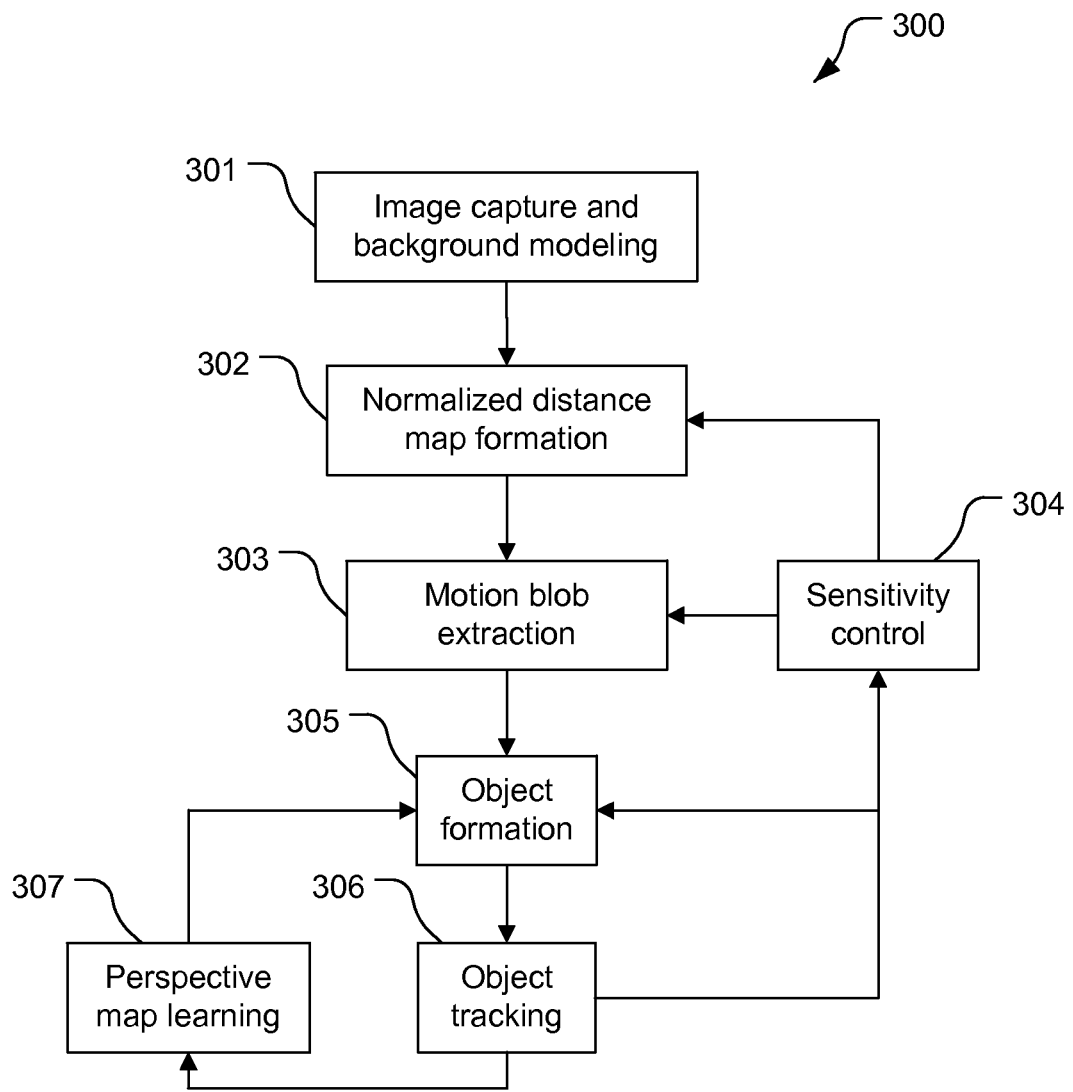
FIG. 3 is a block flow diagram of a process of object detection and tracking.

Referring next to FIG. 3, with further reference to FIGS. 1-2, a process 300 of object detection and tracking within images captured by the camera 102 includes the stages shown. The process 300 is, however, an example only and not limiting. The process 300 can be altered, e.g., by having stages added, removed, rearranged, combined, and/or performed concurrently. The process 300 uses multiple criteria, including sensitivity and perspective, to determine whether pixels in an image are part of the background, and are thus of little or no concern, or part of the foreground, and thus should be tracked and may be worthy of bringing to a user's attention, e.g., through activation of the alarm 112.

At stage 301, images are captured and the background image is modeled. The camera 102 captures images via the camera optics 200 and the image capturing unit 202 and the processor 204 builds a mathematical model of the background image using multiple images captured over time. The background modeling may be performed using any of a variety of known or future-developed background modeling techniques such as a running average method and Gaussian mixture modeling.

At stage 302, a normalized distance map is formed. The processor 204 generates a normalized distance map by comparing the pixels in the present input image with corresponding pixels in the present background image model. The difference in intensity of each pixel is normalized to one of a fixed number of values, here ten (10). Which value a pixel intensity is mapped to is controlled by sensitivity information from stage 304 discussed below. This map is useful in determining significant differences and groups of significant-difference pixels for identifying blobs for object detection.

At stage 303, motion blob extraction is performed. The processor 204 identifies neighboring pixels with significant distances, e.g., over a threshold difference, for aggregation as a likely object. The processor 204 applies a soft-labeling technique to the normalized distance map from stage 302 to identify the blobs. In the soft-labeling technique, the processor 204 analyzes the multiple distance levels and dynamically groups compatible neighboring pixels of similar distance (e.g., adjacent pixels whose distances are within a threshold value, such as one, of each other) to form one or more blobs as appropriate (there may be no identified blobs in an image, e.g., that is similar to the background image). The motion blob extraction also depends on sensitivity information from stage 304. The motion blob extraction is discussed more fully below with respect to FIG. 4.

At stage 304, sensitivity of the object detection is controlled. The sensitivity is the threshold deviation of a pixel relative to the corresponding background pixel before the pixel is considered by the processor 204 to be part of the foreground (not the background). Sensitivity adjustment can help reduce false positive (identification of a background pixel as a foreground pixel) and false negatives (identification of a foreground pixel as a background pixel). In stage 304, the sensitivity is changed by the processor 204 over time. Sensitivity control is discussed more fully below with respect to FIG. 6.

At stage 305, object formation is performed. The processor 204 takes motion blobs identified in stage 303 and combines neighboring blobs to form objects. To determine which motion blobs should be combined into a single object, the processor 204 uses perspective information and objects identified in a previous frame, e.g., the immediately-previous frame. This is discussed more fully below with respect to FIG. 8.

At stage 306, object tracking is performed. The processor 204 tracks the object(s) identified at stage 305, if any, over multiple successive frames. Any of a variety of object tracking techniques may be used by the processor 204 such as Kalman filtering, particle filtering, or mean-shift tracking.

At stage 307, a perspective map is learned over time. The processor 204 learns a perspective map by analyzing tracked objects over time. This process is discussed more fully below with respect to FIG. 9.

Motion Blob Extraction

Figure 4:
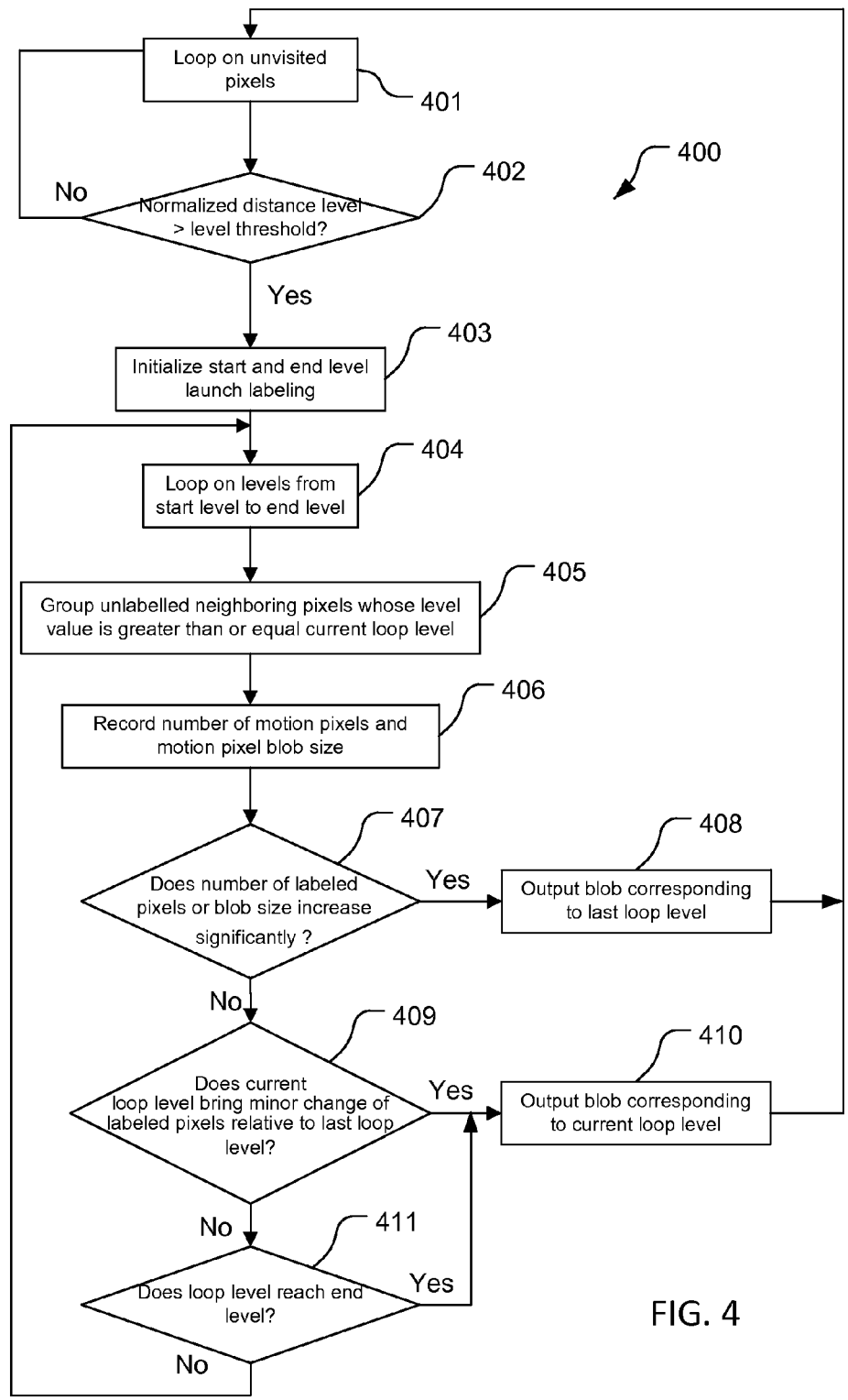
FIG. 4. is a block flow diagram of a process of motion blob extraction.

Referring next to FIG. 4, with further reference to FIGS. 1-3, a process 400 of motion blob extraction includes the stages shown. The process 400 is, however, an example only and not limiting. The process 400 can be altered, e.g., by having stages added, removed, rearranged, combined, and/or performed concurrently. The process 400 provides a soft-labeling technique to extract blobs of motion pixels through grouping neighboring pixels from a start level to an end level of normalized distance and monitoring changes over successive levels in term of number of labeled pixels and the size of a bounding box of a region currently under labeling to automatically terminate the labeling process.

At stages 401, 402, 403, each unvisited image pixels is accessed and its normalized distance level is compared by the processor 204 with a level threshold $T_{lev}$. If the pixel intensity is greater than $T_{lev}$, the process 400 proceeds to stage 403 where a start level and an end level are calculated by taking into account this pixel's normalized distance level and noise levels in a surrounding area (discussed further below). Given a pixel as a seed for the soft-labeling process, the start level is set to the pixel value in the normalized distance level image at this pixel location if this pixel value is greater than a threshold (related to current base sensitivity). The end level is set as one third of this start level, or value 3, whichever is larger. The instant pixel is pushed into a queue from the back that keeps track of labeled pixels in terms of the pixel's coordinates, and the queue is located in memory 210.

At stages 404-411, the processor 204 carries out a level-controlled connected component labeling through the queue from the start level to the end level. Pixels are labeled either 0 (background), or from 1 to 255 for a foreground object (i.e., 255 different objects could be tracked). Each pixel in an object has the same label number even though the distances of the pixels (against their background models) in a single object may be different. The processor 204 finds neighboring pixels in a neighbor-growing manner such that these pixels have distance level values greater than or equal to a current loop level. These pixels are pushed into the queue from the back. Here, the neighbor-growing manner analyzes the seed pixel's eight neighbors, these neighbor pixels' neighbors are further analyzed if their level values are greater than or equal to the current loop level. This process continues recursively until no neighboring pixel having its level value greater than or equal to the current loop level. Then, the loop level value decreases by 1 if it is still greater than the end level. The process is repeated, i.e., find neighboring pixels in a neighbor-growing manner such that these pixels have distance level values greater than or equal to the current loop level. These pixels are stored in the queue. Each round in the labeling process is a connected-component labeling process, but with different level threshold (determined by the value of the loop level variable). The set of pixels resulting from a smaller loop level is a super set of the set resulting from a larger loop level. A pixel is considered as a labeled pixel (to be concise, a temporary labeled pixel since it may not be acceptable depending on at which loop level the iteration is terminated) if its level value is greater than or equal to the loop level. By monitoring the changes of numbers of labeled pixels and the size of the blob including these labeled pixels between successive iterations, the soft-labeling process can be terminated automatically, without necessarily reaching the end level. As discussed further below with respect to stage 407, if the number of labeled pixels or the size of a formed blob (formed by these labeled pixels) increases significantly in contrast to that from the last loop level, this would indicate the current loop level is not good, and thus the result from last loop value is selected as an output in stage 408. By comparing to the last iteration, if the change of labeled pixel number is minor, the result from the current loop is selected as a final output of the soft-labeling.

At stage 404, given a loop level, each pixel in the queue is picked up. The processor 204 examines each of this pixel's unlabeled neighboring pixels such that a neighbor pixel is added into the queue from the back if the neighbor pixel's normalized distance level is greater than a current loop level. In this way, the queue contains all labeled pixels, which are clustered into segments naturally corresponding to different loop levels. No pixels are removed from the queue during a labeling process that is initialized from an unvisited seed pixel.

At stage 405, the processor 204 groups unlabeled neighboring pixels whose level values are greater than or equal to the current loop level.

At stage 406, with the loop level-specific grouping process completed, i.e., if there are no more further unlabeled neighbor pixels have larger normalized distance level than current loop level for all pixels in the queue, the number of pixels that are added to the queue and the size of the blob bounding these pixels is monitored.

At stage 407, the number of labeled pixels of a blob and the blob size are compared to those from the last loop level. If there is not a significant increase in either the number of added pixels to a blob or in the size of a bounding box (a rectangle, preferably the smallest rectangle, bounding a labeled blob) compared to those at the last loop level, then the process 400 proceeds to stage 409. If at stage 407 there is a significant increase in either the number of added pixels or in the size of a bounding box compared to those at the last loop level, the current loop level could result in incorrect labeling, and thus the process 400 proceeds to stage 408 where a result associated with the last loop level is outputted. For example, significant change can be identified if any of the following conditions are satisfied: 1) if the number of added pixels is at least three times more than the overall labeled pixel number at the last loop level; 2) if the size increase of the bounding box is at least three times more than the size of the bounding box obtained at the last loop level; or 3) if the size increase of the bounding box is at least six times more than the number of added pixels at the last loop level. At stage 408, a blob is found and the process 400 returns to stage 401 for the next round of soft-labeling for a new image pixel.

At stage 409, the processor 204 determines whether there is a minor increase in the number of added pixels compared to that for last loop level. If not, then the process 400 proceeds to stage 411. If so, the current loop level could result in a converged labeling, and thus the process 400 proceeds to stage 410 where a result associated with current loop level is outputted. For example, a minor change is identified if the number of added pixels at the current loop level is less than the number of added pixels at the last loop level while this decrease is also less than half of the number of added pixels at the last loop level. In other words, the labeling process terminates once the decrease rate of the number of added pixels drops below half of that at the last loop level. At stage 410, a blob is found and the process 400 returns to stage 401 for the next round of soft-labeling for a new image pixel.

At stage 411, the processor 204 determines whether the loop level has reached the end level. If so, the process 400 proceeds to stage 410, and otherwise the process 400 returns to stage 404 for continued grouping with a decreased loop level, e.g., decreased by one.

During above labeling, the number of labeled pixels that have normalized distance levels of MaxLev are saved; The total number of accepted labeled pixels of output blobs are also saved. Both of these values will be used for object fitness index calculation in the object formation stage 305 shown in FIG. 3 and as discussed below.

Object Formation

Obtained motion blobs are further processed by the processor 204 to generate objects by merging neighboring blobs together, which is controlled by perspective information and previously tracked objects. For each tracked object from the previous frame, the processor 204 finds all the matched blobs in the current frame, and links them together to form a group of blobs associated with the previously tracked object. A blob matches a tracked object if the blob's bounding box occludes the object's bounding box or a predicated bounding box for the object for the present frame. For a tracked object, the object's location is predicated for the next frame according to the object's location in a current frame and its moving speed and direction. As such, a predicated bounding box can be obtained by placing the bounding box of the object from the previous frame in a predicated location in the current image.

Within each blob group, distances for all possible pairs of blobs are calculated and sorted from the smallest to the largest. Perspective and tracked object's size (height and width) are taken into account in distance calculation by:

$$d(b1, b2) = \max\left(\frac{(y_{b1} - y_{b2}) \times p_o}{h_o \times p_{b1}}, \frac{|x_{b1} - x_{b2}| \times p_o}{w_o \times p_{b1}}\right)$$

Where b1 stands for blob 1, b2 stands for blob 2, o the matched object of b1 and b2; here, it is assumed that b1 is closer to the camera 102 than b2. Parameters $h_o$, $w_o$ and $p_o$ represent the object's height (in pixels), width (in pixels), and perspective scaling factor; $(x_{b1}, y_{b1})$ is b1's foot point, defined as the middle point of the bottom side of the object's bounding box, and $p_{b1}$ is the perspective factor at point $(x_{b1}, y_{b1})$ in the perspective map. Parameters $(x_{b2}, y_{b2})$ and $p_{b2}$ are defined similarly but for blob 2.

Figure 8:
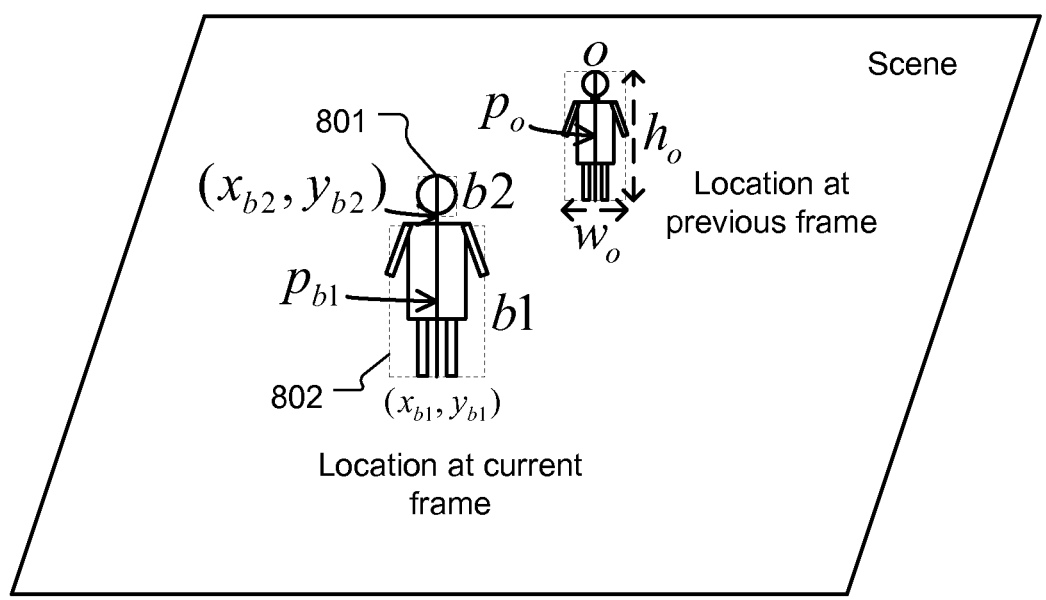
FIG. 8 is a simplified perspective view of an object in multiple images at different locations.

The value d(b1, b2) is a relative distance. Blob 1 and blob 2 are considered compatible with the tracked object from a perspective point of view if d(b1, b2)≤1, which means that one blob is within a perspective predicted distance from the other by referring to the size of the tracked object. For example as shown in FIG. 8, a person tracked correctly in a previous frame matches two blobs in a current frame, one for the person's head and one for the person's other body parts, with corresponding bounding boxes 801, 802. For illustration convenience, it is assumed that the two perspective factor values for object o and blob 1 are accurate, both reflected by the height of the person in corresponding locations. From this drawing, the head blob is reached by $p_{b1}$ and thus the head blob should be considered to be part of the tracked person even if the head blob is separated from the rest of the person's body.

The processor 204 merges all pairs of blobs if they are compatible. The blobs are merged gradually in an increasing order of distance until no more compatible blob pairs exist within the blob group under consideration. Whenever two blobs are merged, their counts of labeled pixels with the maximum normalized distance level are summed. The counts of all labeled pixels from these two blobs are also summed. Both sums are carried over to the final merged blob for creating an object.

Blobs that do not match any previously tracked objects or are left over after the above merging process may undergo another merging process that takes into account perspective information and blob sizes if object size filtering is enabled. For object detection and tracking with zero manual configuration, each of these left over blobs is used by the processor 204 to create an object for object tracking.

After creating an object from a blob, the processor 204 divides the number of labeled pixels with the maximum normalized distance level by the total number of actual labeled pixels to get its percentage. The percentage is further linearly quantified into one integer, called an object fitness index, in the range from 0 to 9. For example, if the percentage is greater than or equal to 40% but less than 50%, the blob's fitness index is 4. Object fitness index is useful for automatic sensitivity determination, as will be addressed next.

Automatic Sensitivity Determination

Two primary factors are used by the processor 204 to establish the sensitivity map: a suitable base sensitivity factor and the capability to automatically adapt to noisy scene areas. The base sensitivity factor is assigned to all scene locations initially, and it is adjusted automatically by feedback of object activities in the scene. As object activities occur in the scene, some areas may be identified as noisy, e.g., with observation of frequent random motions, which can be recorded by the scene noise map. To eliminate noise effects in noisy areas, motion pixels appearing in these areas may be either masked out or detected using a large sensitivity factor $k_i$. The use of masking-out makes it difficult if not impossible to detect and track objects within noisy areas, e.g., people moving in front of or behind a moving tree. Thus, the processor 204 increases the sensitivity factor for noisy locations, which can still detect real subjects in noisy areas while significantly removing noise motions from labeling as an object for tracking. Analysis of object activities is used in automatically determining the base sensitivity factor and identifying noisy locations in the scene.

Figure 5:
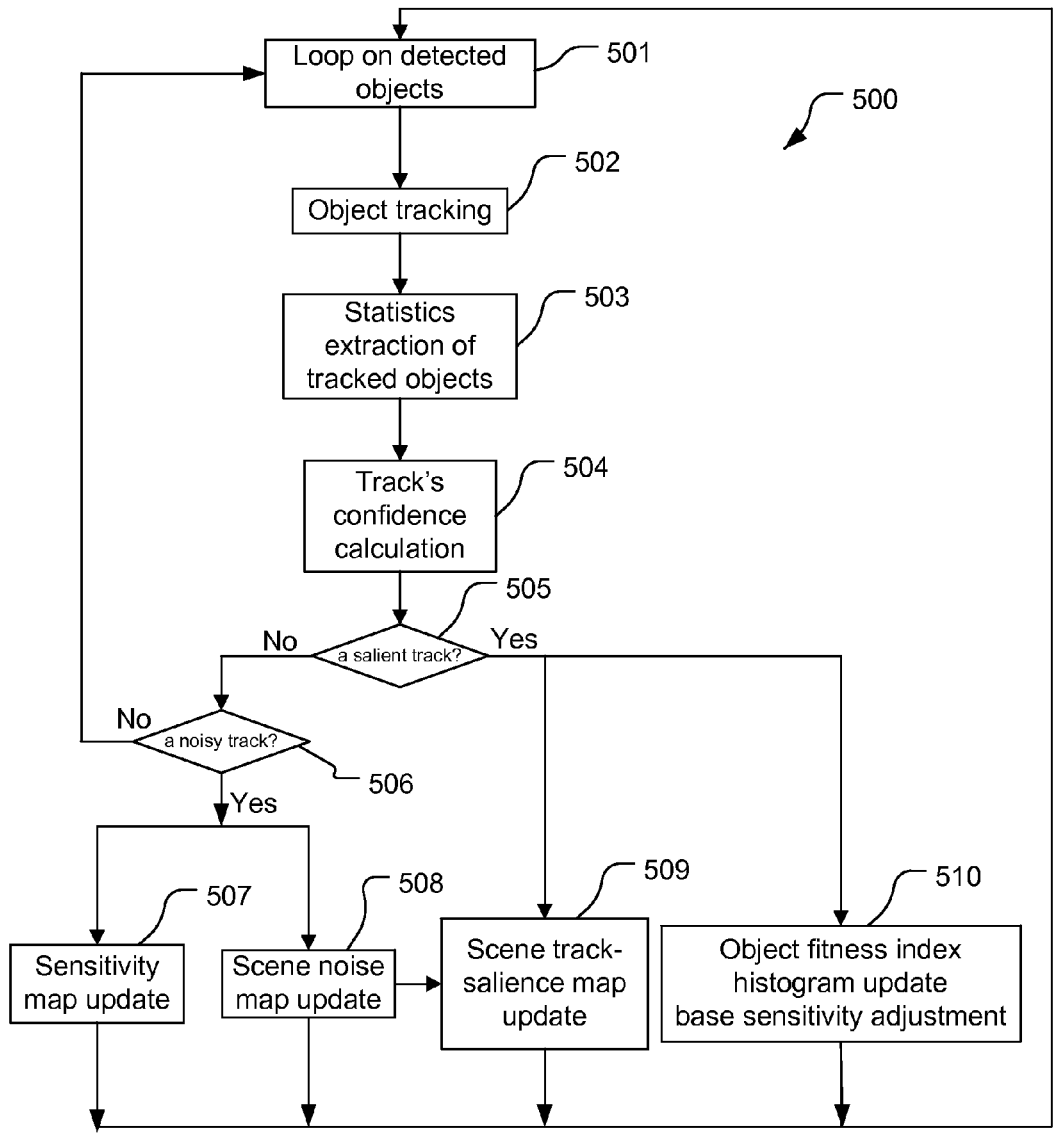
FIG. 5 is a block flow diagram of a process of building scene awareness measures.

Referring to FIG. 5, with further reference to FIGS. 1-3, a process 500 of building scene awareness measures includes the stages shown. The process 500 is, however, an example only and not limiting. The process 500 can be altered, e.g., by having stages added, removed, rearranged, combined, and/or performed concurrently.

At stages 501, 502, the processor 204 matches detected objects and tracks the matched objects over successive frames.

At stage 503, the processor 204 calculates the statistics of the tracked objects. Here, the processor analyzes object features including object size, movement direction, speed, number and frequency of large changes of movement direction among successive frames, number of salient movement segments of trajectory. A confidence value can be derived from the statistics of these features of tracked objects. A salient move segment is a segment on a track along which an object has moved persistently in a constant direction and over a sufficient distance. Every time the object changes its move direction, a previous salient segment (if any) is considered invalid, and a test is carried out to check whether the object will have another salient segment in this new move direction.

At stage 504, with the statistical information from stage 503, persistency levels of a tracked object over frames, in terms of a confidence value, can be measured by the processor 204 for these object features. The confidence value is measured by taking into account the statistics of the features of tracked the objects. The confidence value can be used to categorize the track as a salient track, a noisy track, or uncertain, and to update the sensitivity factor.

At stage 505, the processor 204 uses these features to determine whether a track is a salient track. If the track is not a salient track, then the process 500 proceeds to stage 506, and otherwise proceeds to stages 509, 510.

At stage 506, the processor 204 determines whether an object is of a practical subject in the scene or if the object is of a noisy track (e.g., due to moving tree leaf, shadows or light reflections). If the track is not a noisy track, then the process 500 returns to stage 501, and otherwise proceeds to stages 507, 508.

At stages 507-510, the processor 204 uses the confidence value to update the sensitivity map, update a scene noise map, update a track-salience map, update an object fitness index histogram and adjust the base sensitivity factor. While different values could be used, here a confidence value greater than 0.67 indicates a track is a salient track; a confidence value less than 0.33 indicates a noise track; and other values make a track uncertain. The calculation of confidence value is based on the information available so far, and it is updated dynamically. By summarizing the confidence value over time, a track can be justified about whether it is a salient track, or a noise track, or uncertain. For example, a track is considered as a salient track if the tracked object has had more than two salient move segments, or it moves in a direction persistently over a very long distance. A track may be considered as a noise track if the tracked object's size and/or move direction changes dramatically between successive frames and frequently, or it appears and disappears frequently, such as objects caused by waving tree leaf movements. An uncertain type track is a state when a tracked object cannot be justified as either a salient track or noise track. For example, a tracked object is considered uncertain if it has not appeared in the scene for a preset time, e.g., five frames.

At stage 508, every time a scene location is visited by a noisy track, the track's corresponding value in the scene noise map increases by a preset value, e.g., five. Similarly, at stage 509, if a scene location is visited by a salient track, the track's corresponding value in the track salience map is set to the maximum, here 255. As time passes, the track salience map could record locations where highly trusted objects have occurred while the scene noise map indicates noisy locations in scene. These two maps are exclusive of each other such that any scene location cannot have non-zero values in both maps. A scene location can, however, have zero values in both maps if the scene has not been touched by either a salient track or a noisy track.

Additionally, pixel values in the track salience map and the scene noise map decay gradually at a controlled speed to avoid their forever impacts on future process. Thus, a scene's location values in both maps will count down to zero with time if no other salient tracks or noisy tracks touch this location again.

At stage 507, when a track is identified as noisy, the track's impacted pixels (visited by this track) in the sensitivity map are set to the maximum sensitivity factor $k_{max}$ (here 10), which in effect minimizes the capability of motion pixel detection. Similar to the decaying process for the scene noise map and the track-salience map, pixel values other than the current base sensitivity factor also decay gradually back to the base sensitivity factor at a very slow speed for the sensitivity map. If there is no further noisy track found in a noisy location, the location's sensitivity eventually returns to the current base sensitivity factor. If noise tracks are identified from time to time in an area, this area could have high sensitivity factor values most times since the area may not get chance to recover.

At stage 510, whenever a salient track is identified, the object fitness index histogram is updated by the processor 204 incrementing the count of a corresponding index bin of the tracked object. Further, the base sensitivity factor is checked to determine whether the base sensitivity should be adjusted using the strategies specified in FIGS. 6 and 7.

Figure 7:
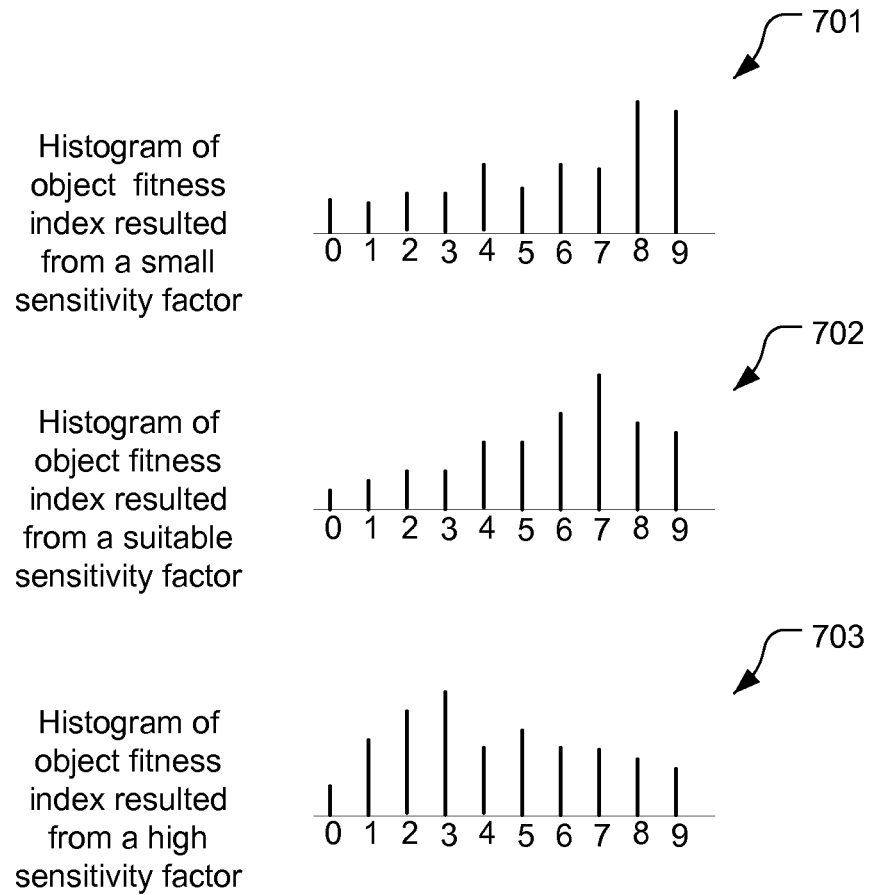
FIG. 7 is a set of graphs of object fitness index histograms.

Referring to FIG. 7, three examples of object fitness index histograms are shown. Histogram 701 is for a small base sensitivity factor and whose peak index is 8. Histogram 702 is for a suitable base sensitivity factor and whose peak index is 7. Histogram 703 is for a high base sensitivity factor and whose peak index is 3.

Figure 6:
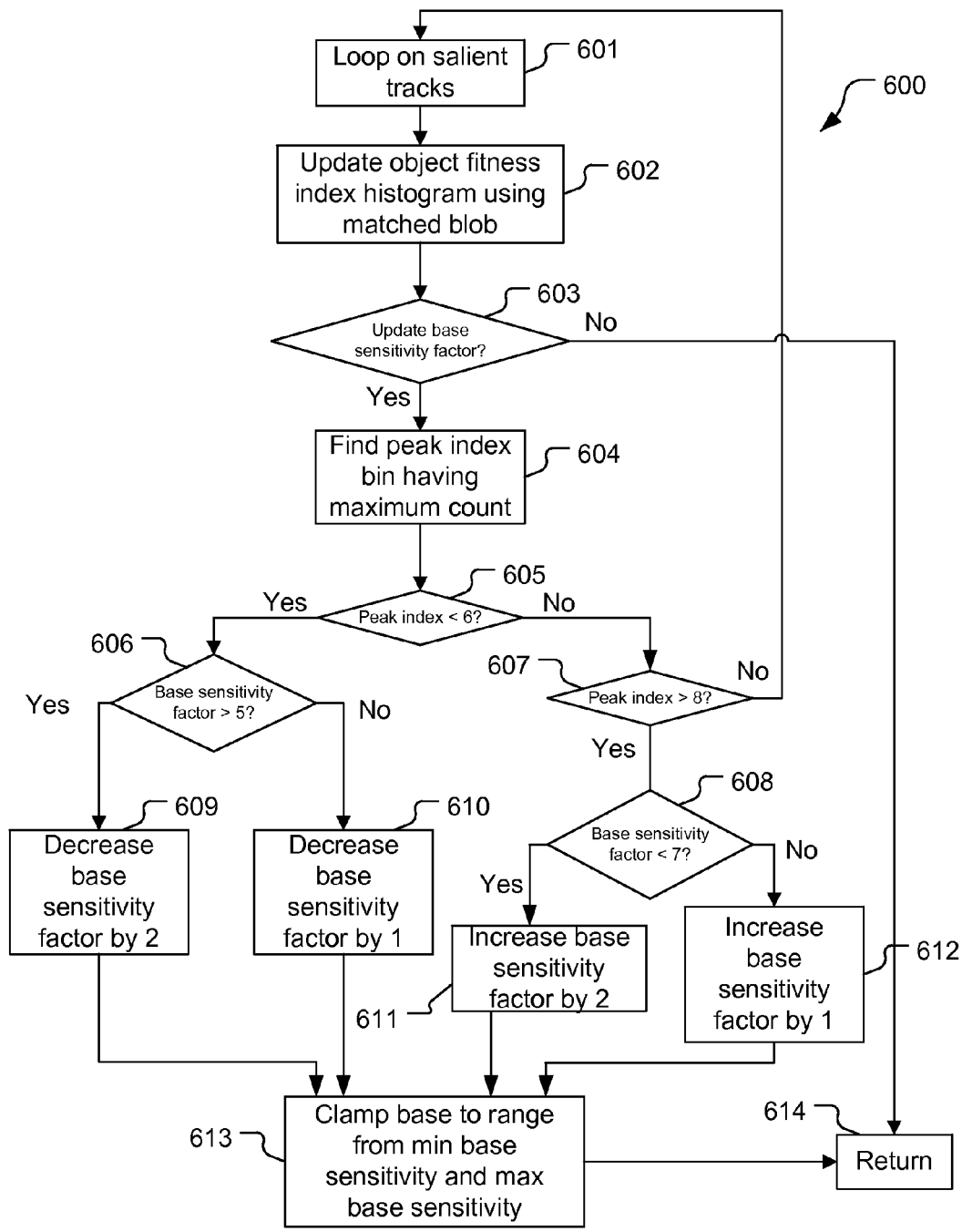
FIG. 6 is a block flow diagram of a process of automated base sensitivity adjustment.

Referring to FIG. 6, with further reference to FIGS. 1-3 and 5, a process 600 of automated base sensitivity adjustment includes the stages shown. The process 600 is, however, an example only and not limiting. The process 600 can be altered, e.g., by having stages added, removed, rearranged, combined, and/or performed concurrently.

The mechanism behind the automated updating of the base sensitivity is based on maintaining a global histogram of object fitness index as shown in FIG. 7 over time. For each new image frame, objects are detected, and their object fitness indexes are calculated and used to update the histogram of object fitness index. Only if the summation of the counts over all bins of the histogram exceeds a present number (e.g., 500), then the histogram's bin with the maximum counts is identified, based on which a base sensitivity is calculated. The base sensitivity is not determined on a frame by frame base. The base sensitivity changes only after a certain period of time such that the count sum of the histogram reaches a pre-set value. Once this value is reached, a new base sensitivity is obtained, which may be the same as or different from the current base sensitivity. Every time this happens, the histogram is reset to zero for all its bins, and a new round of histogram update proceeds. Every time the count sum of the histogram of object fitness index reaches a pre-set value, its bin index (called peak bin index) with the maximum count is identified.

At stages 601-604, salient tracks are looped and analyzed and the processor 204 updates the object fitness index histogram using matched blobs. Only objects associated with salient tracks are used for the update of this histogram. When a histogram is updated, the base sensitivity factor is examined to determine whether this factor should be updated by taking into account how long since the last base sensitivity factor update and whether the histogram has enough total counts over all bins. If the processor 204 determines not to update the base sensitivity factor, the process 600 proceeds to stage 614 where the process 600 returns to stage 501 in FIG. 5. Otherwise, the process 600 proceeds to stage 604 where the object fitness index having the maximum count, i.e., peak index, is found with an integer value from 0 to 9.

To a certain extent, the value of peak index can indicate the quality of objects matched by salient tracks. A small peak index could mean there are a small percentage of strong motion pixels within these objects while the majority of the pixels are weak motion pixels due to the aforementioned soft-labeling process, which could suggest that base sensitivity factor should be lowered so as to increase the ratio of strong motion pixels to weak motion pixels. A high peak index could mean there are a high percentage of strong motion pixels within objects, which suggests the base sensitivity is too low and prone to generate noisy blobs. Thus, a value of the peak index preferably offers reliable motion detection performance in detecting objects of low contrast without creating noise blobs.

Experiments on a large number of video data using the soft-labeling process have shown that a good peak indexes are 6 or 7. If the obtained peak index bin is different from 6 or 7, an updating scheme changes the base sensitive such that the peak bin index in the future should move toward to the expected peak bin index (6 or 7). That is, base sensitivity is increased if a resultant peak index is greater than 7 in order to shift future peak index to a lower value. Similarly, the base sensitivity is decreased if a resultant peak index is less than 6, to move future peak index to a higher value. This is a feed-back control for automated adjustment of base sensitivity based on the histogram, i.e., in a sense of a summarization for the quality of obtained objects that are derived using the current base sensitivity. These strategies are implemented in steps 605-613.

At stage 605, the processor 204 determines whether the peak index value is less than 6. If so, the process 600 proceeds to stage 606 and otherwise proceeds to stage 607.

At stage 606, the processor 204 determines whether the peak index value is greater than 5. If so, the process 600 proceeds to stage 609 and otherwise proceeds to stage 610.

At stage 607, the processor 204 determines whether the peak index value is greater than 8. If so, the process 600 proceeds to stage 608 and otherwise returns to stage 601.

At stage 608, the processor 204 determines whether the peak index value is less than 7. If so, the process 600 proceeds to stage 611 and otherwise proceeds to stage 612.

At stage 609, the processor 204 decreases the sensitivity factor by 2 and then the process 600 proceeds to stage 613.

At stage 610, the processor 204 decreases the sensitivity factor by 1 and then the process 600 proceeds to stage 613.

At stage 611, the processor 204 increases the sensitivity factor by 2 and then the process 600 proceeds to stage 613.

At stage 612, the processor 204 increases the sensitivity factor by 1 and then the process 600 proceeds to stage 613.

At stage 613, the processor 204 clamps the base sensitivity to the range from the minimum base sensitivity to the maximum base sensitivity.

Perspective Map Learning

Camera calibration information helps robust object detection and tracking, and typically uses human manipulations. Such human manipulation is preferably eliminated by the perspective map learning implemented by the processor 204.

Figure 9:
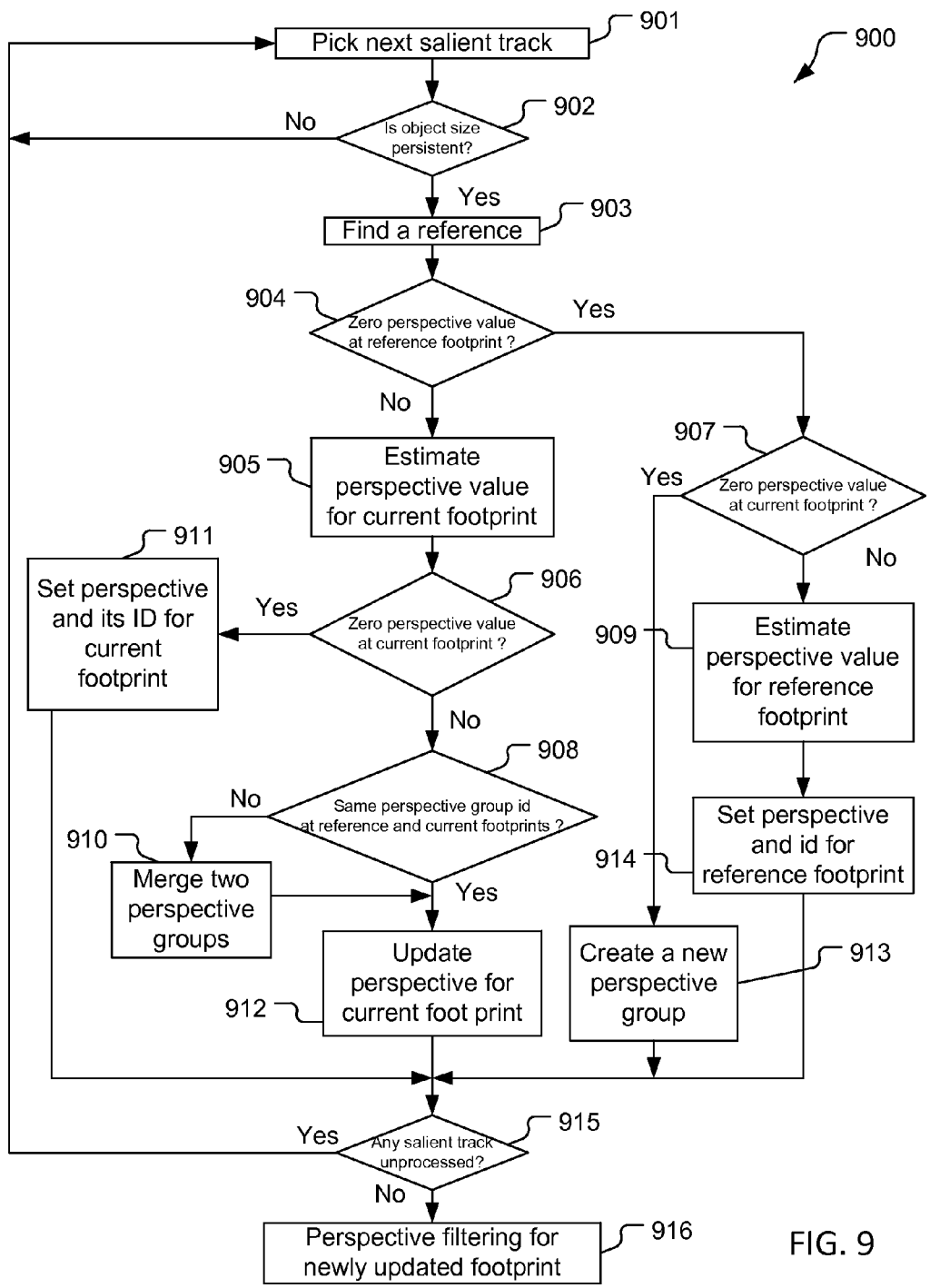
FIG. 9 is a block flow diagram of a process of perspective map learning.

Referring to FIG. 9, with further reference to FIGS. 1-3, a process 900 of perspective map learning includes the stages shown. The process 900 is, however, an example only and not limiting. The process 900 can be altered, e.g., by having stages added, removed, rearranged, combined, and/or performed concurrently. The process 900 extracts the camera's perspective information by taking into account object sizes of salient tracks to build a scene perspective map. Each pixel value of the perspective map is a scaling factor to indicate a relative size in a corresponding scene location of an object's footprint (i.e., the middle point of a bottom side of an object's bounding box). In addition, each pixel of non-zero perspective factor is associated with a perspective group ID which indicates this perspective value takes effect only among pixels that have the same group ID.

At stages 901-904, objects are analyzed for saliency, persistency, and perspective at a reference point. At stages 901-902, a salient track is selected, and its tracked object's size persistency is evaluated. An object is considered size persistent if the object's size is within a certain distance from the mean of the object size in term of its derived standard deviation, where the mean and standard deviation of object size are obtained using weighting averaging over time. Every time a large change is detected from the object's size against the current mean, a new mean and standard deviation is initialized and then updated starting from the beginning. If the object size is determined by the processor 204 not to be persistent, then the process 900 returns to stage 901 where the next salient track is picked for consideration. Otherwise, at stage 903, a perspective value is estimated for the current object's footprint by comparing with a reference object size of the same tracked subject. If more than one reference footprint is available, the processor 204 chooses the reference point that is furthest from current object in the vertical dimension. During object tracking, persistent objects are saved to the server 104 as reference candidates.

When a tracked object is determined to be persistent in size, a reference object's size $S_r$ and its footprint $(x_r, y_r)$ are obtained. At stage 904, the processor 204 determines whether the perspective value is zero at the reference footprint. If the perspective value is zero, the process 900 proceeds to stage 907, and if the perspective value is non-zero, the process 900 proceeds to stage 905.

At stage 905, a perspective factor is obtained for the current object o of size $s_o$ at footprint $$(x_o, y_o) \text{ by } p_o = \frac{S_o}{S_r} \times p_r.$$

The value of $p_o$ is used to update pixel values of the perspective map through a weighting average at stage 912 for location $(x_o, y_o)$ if the location has non-zero perspective values already, as determined by the processor 204 at stage 906, and belongs to the same perspective group as the reference footprint, as determined by the processor 204 at stage 908. If the location $(x_o, y_o)$ has non-zero perspective values already, as determined by the processor 204 at stage 906, but belongs to a different perspective group, as determined by the processor 204 at stage 908, the two perspective groups are merged at stage 910 to have a unified group ID for their constituent locations, and the processor 204 updates the perspective values for the current footprint at stage 912. If the perspective value at the current footprint is determined to be zero at stage 906, then the processor sets the perspective value $p_o$ and the group ID for the current footprint using information from the reference at stage 911. In this way, perspective IDs are propagated over a scene with persistent tracks. If both reference and current footprints have zero perspective, as determined at stages steps 904 and 907, a new perspective group is created such that the current footprint is initialized to a preset perspective value and assigned a new group ID at stage 913. If the reference footprint's perspective values is zero but the current footprint's perspective value is not as determined at stages 904 and 907, then at stage 909 a perspective value is estimated for the reference footprint in contrast to the current footprint, and at stage 914 the estimated perspective value is assigned to the reference footprint while the perspective ID of the current footprint is also passed to the reference. At stage 915, the processor 204 checks whether other salient tracks remain to be processed. If not, then the process 900 proceeds to stage 916 where the processor 204 applies a post smoothing process to those affected footprints and their neighboring pixels to remove noise in their perspective values. If salient tracks remain, then the process 900 returns to stage 901.

Other Considerations

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, some configurations (including implementations) may employ a computer system to perform methods in accordance with various configurations of the invention. According to a set of configurations, some or all of the procedures of such methods are performed by the computer system in response to a processor executing one or more sequences of one or more instructions (which might be incorporated into the operating system of the computer system and/or other code, such as an application program) contained in working memory. Such instructions may be read into the working memory from another computer-readable medium, such as one or more storage device(s). Merely by way of example, execution of the sequences of instructions contained in the working memory might cause the processor(s) to perform one or more procedures of the methods described herein.

The terms "machine-readable medium" and "computer-readable medium," as used herein, refer to any medium that participates in providing data that causes a machine to operate in a specific fashion. A computer-readable medium may be a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory. Transmission media include, without limitation, coaxial cables, copper wire and fiber optics. Hence, transmission media can also take the form of waves (including without limitation radio, acoustic and/or light waves, such as those generated during radio-wave and infrared data communications).

Physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to a processor for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system. These signals, which might be in the form of electromagnetic signals, acoustic signals, optical signals and/or the like, are all examples of carrier waves on which instructions can be encoded, in accordance with various configurations of the invention.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Elements discussed above may be components of a larger system, wherein rules may apply and/or take precedence over rules explicitly or implicitly discussed Still other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. For example, features discussed with respect to the processing unit 204 in the camera 102 could be performed in the server 104, with the server 104 including one or more CPUs and/or DSPs and corresponding software stored in memory for execution by the CPU(s) and/or DSP(s) to perform the functions discussed.

Also, as used herein, including in the claims, "or" as used in a list of items prefaced by "at least one of" indicates a disjunctive list such that, for example, a list of "at least one of A, B, or C" includes A or B or C or AB or AC or BC or ABC (i.e., A and B and C), or combinations with more than one feature (e.g., AA, AAB, ABBC, etc.).

Further, more than one invention may be disclosed.

What is claimed is:

1. An image capture system comprising:
an image capture unit configured to capture a first image frame comprising a set of pixels; and
a processor coupled to the image capture unit and configured to:
determine a normalized distance of a pixel characteristic between the first image frame and a second image frame for each pixel in the first image frame, wherein the normalized distance is a non-physical distance;
compare the normalized distance for each pixel in the first image frame against a pixel sensitivity value for that pixel;
determine that a particular pixel of the first image frame is a foreground or background pixel based on the normalized distance of the particular pixel relative to the pixel sensitivity value for the particular pixel; and
adapt the pixel sensitivity value for each pixel over a range of allowable pixel sensitivity values.

2. The system of claim 1 wherein the processor is configured to compute the pixel sensitivity value for each pixel based on a base sensitivity value.

3. The system of claim 2 wherein the processor is configured to adjust the base sensitivity value based on ratios of strong motion pixels to total motion pixels in identified blobs in the first image frame.

4. The system of claim 3 wherein the processor is configured to:
determine a histogram of percentage of strong motion pixels to total motion pixels in the identified blobs;
determine a peak index value of the histogram with a highest count among all index values of the histogram;
decrease the base sensitivity value if the peak index value is undesirably low; and
increase the base sensitivity value if the peak index value is undesirably high.

5. The system of claim 1 wherein the processor is configured to determine the normalized distance as one of a finite plurality of normalized distance values, and wherein the second image frame is a background frame.

6. The system of claim 1 wherein the processor is further configured to identify motion blobs by:
grouping neighboring pixels from a start level to an end level of the normalized distance; and
monitoring changes over different levels in terms of number of pixels determined to be foreground pixels and a size of a bounding box of a region enclosing these foreground pixels.

7. The system of claim 6 wherein the processor is further configured to generate objects by merging neighboring blobs together based on perspective information and previously tracked objects.

8. The system of claim 1 wherein the processor is further configured to:
determine whether each location of the second image frame is noisy and, if so, how noisy;
determine whether each location in the second image frame is part of a salient track; and
learn perspective information of a monitored scene.

9. The system of claim 1 wherein the processor is further configured to:
track objects over multiple frames;
compute a confidence value for each tracked object by calculating statistics of features of the objects over the multiple image frames; and
account for variant object features.

10. The system of claim 9 wherein the processor is further configured to:
update a scene noise map based on the confidence value of each of the tracked objects;
update a sensitivity map based on the confidence value of each of the tracked objects;
update a track salience map based on the confidence value of each of the tracked objects; and
update an object fitness index histogram based on the confidence value of each of the tracked objects.

11. The system of claim 10 wherein the processor is further configured to compute the sensitivity value for each pixel based on the scene noise map and the track salience map.

12. The system of claim 9 wherein the processor is further configured to automatically determine a perspective map by identifying size-persistent tracked objects and by comparing sizes of the size-persistent tracked objects at different scene locations relative to one or more reference object sizes.

13. An imaging method comprising:
capturing a first image frame comprising a set of pixels;
determining, using a processor, a normalized distance of a pixel characteristic between the first image frame and a second image frame for each pixel in the first image frame, wherein the normalized distance is a non-physical distance;

varying a value of a reference from a start value to an end value within a range of possible normalized distance values;

comparing the normalized distance for each unlabeled pixel in the first image frame against a present value of the reference; and labeling pixels each of whose respective normalized distance is greater than the present value of the reference.

14. The method of claim 13 further comprising:
grouping labeled neighboring pixels of the first image frame into a blob; and
monitoring changes over different values of the reference in terms of number of pixels in the blob and a size of a bounding box of the blob.

15. The method of claim 14 further comprising generating objects by merging neighboring blobs together based on perspective information and previously tracked objects.

16. The method of claim 13 further comprising:
computing a pixel sensitivity value for each pixel based on a base sensitivity value;
using the pixel sensitivity value to determine the normalized distances and to group pixels into a blob; and
altering the base sensitivity value.

17. The method of claim 16 wherein altering the base sensitivity value is based on ratios of strong motion pixels to total motion pixels in identified blobs in the first image frame.

18. The method of claim 17 wherein altering the base sensitivity value comprises:
determining a histogram of percentage of strong motion pixels to total motion pixels in the identified blobs;
determining a peak index value of the histogram with a highest count among all index values of the histogram;
decreasing the base sensitivity value if the peak index value is undesirably low; and
increasing the base sensitivity value if the peak index value is undesirably high.

19. The method of claim 13 further comprising:
determining whether each location of the second image frame is noisy and, if so, how noisy;
determining whether each location in the second image frame is part of a salient track; and
learning perspective information of a monitored scene.

20. The method of claim 13 further comprising:
tracking objects over multiple image frames;
computing a confidence value for each tracked object by calculating statistics of features of the objects over the multiple image frames; and
accounting for variant object features.

21. The method of claim 20 further comprising:
updating a scene noise map based on the confidence value of each of the tracked objects;
updating a sensitivity map based on the confidence value of each of the tracked objects;
updating a track salience map based on the confidence value of each of the tracked objects; and
updating an object fitness index histogram based on the confidence value of each of the tracked objects.

22. The method of claim 21 further comprising computing a pixel sensitivity value for each pixel based on the scene noise map and the track salience map.

23. The method of claim 20 further comprising automatically determining a perspective map by identifying size-persistent tracked objects and by comparing sizes of the size-persistent tracked objects at different scene locations relative to one or more reference object sizes.

24. A moving object detection system comprising:
an image capture unit configured to capture image frames each comprising a set of pixels;
means for determining a normalized distance of a pixel characteristic between a plurality of the image frames for each pixel in the image frames, wherein the normalized distance is a non-physical distance;
means for identifying motion blobs comprising neighboring pixels of similar normalized distance values; and
means for forming objects by combining neighboring motion blobs based on perspective information associated with the blobs.

25. The system of claim 24 further comprising means for determining the perspective information by tracking an object over multiple ones of the image frames and using one or more reference object sizes in the multiple ones of the image frames.

26. The system of claim 24 further comprising means for altering pixel sensitivity information based on a base sensitivity value, a scene noise map, and a track salience map, wherein the means for determining the normalized distance uses the sensitivity information to determine the normalized distance.

27. The system of claim 26 wherein the means for altering the pixel sensitivity information are configured to adjust a base sensitivity value based on ratios of strong motion pixels to total motion pixels in identified blobs in the image frames.

28. The system of claim 27 further comprising:
means for determining a histogram of percentage of strong motion pixels to total motion pixels in the identified blobs;
means for determining a peak index value of the histogram with a highest count among all index values of the histogram;
means for decreasing the base sensitivity value if the peak index value is undesirably low; and
means for increasing the base sensitivity value if the peak index value is undesirably high.

29. The system of claim 24 wherein the means for identifying motion blobs comprises:
means for grouping neighboring pixels from a start level to an end level of the normalized distance; and
means for monitoring changes over different levels in terms of number of pixels determined to be foreground pixels and a size of a bounding box of a region enclosing these foreground pixels.

30. The system of claim 29 further comprising means for generating objects by merging neighboring blobs together based on perspective information and previously tracked objects.

31. The system of claim 24 further comprising:
means for tracking objects across multiple image frames;
means for computing a confidence value for each tracked object by calculating statistics of features of the objects over the multiple image frames; and
means for accounting for variant object features.

32. The system of claim 31 further comprising:
means for updating a scene noise map based on the confidence value of each of the tracked objects;
means for updating a sensitivity map based on the confidence value of each of the tracked objects;
means for updating a track salience map based on the confidence value of each of the tracked objects;

means for updating the object fitness index histogram based on the confidence value of each of the tracked objects.

33. The system of claim 24 further comprising:
means for determining whether each location of a first image frame is noisy and, if so, how noisy;
means for determining whether each location in the first image frame is part of a salient track; and
means for learning perspective information of a monitored scene.

* * * * *